United States Patent [19]

Moore, III

[11] 4,271,603

[45] Jun. 9, 1981

[54] COFFEE ROASTER

[76] Inventor: Thomas J. Moore, III, 8 Royal Crest Dr., Apt. 7, Nashua, N.H. 03060

[21] Appl. No.: 67,279

[22] Filed: Aug. 17, 1979

[51] Int. Cl.³ .............................................. F26B 9/08
[52] U.S. Cl. ...................................... 34/181; 34/233; 99/286
[58] Field of Search .................... 34/179, 181, 54, 225, 34/219, 233; 366/331, 309, 314; 99/286, 287

[56] References Cited

U.S. PATENT DOCUMENTS

| 262,390 | 8/1882 | Fisher | 34/179 |
|---|---|---|---|
| 1,665,778 | 4/1928 | Frederickson | 34/179 |
| 1,985,604 | 12/1934 | Fitzgerald | 34/179 |
| 2,069,193 | 1/1937 | Behr et al. | 34/181 |
| 2,326,094 | 8/1943 | Cusack et al. | 34/179 |
| 2,451,462 | 10/1948 | Yglesias-Paz | 34/181 |

FOREIGN PATENT DOCUMENTS 2620800 11/1977 Fed. Rep. of Germany ............ 99/286

Primary Examiner—Larry I. Schwartz
Attorney, Agent, or Firm—Kenway & Jenney

[57] ABSTRACT

A personal coffee roaster for effecting roasting of small quantities of green coffee beans and having limited physical size and weight, has a roasting chamber with at least one perforate wall, elements for creating a heated gaseous flow through the perforate wall into the roasting chamber and an exit orifice leading from the roasting chamber, in gaseous communication therewith, for providing an outlet for the heated gas flow. The apparatus further has an air flow rate controlling element for variably controlling the rate of flow of the heated gas through the roasting chamber. The roasting chamber, stirring elements therein, and a driven rotating shaft are inclined to a vertical axis for effecting better tumbling action and stirring within the roasting chamber.

9 Claims, 5 Drawing Figures

COFFEE ROASTER

BACKGROUND OF THE INVENTION

The invention relates in general to food processing and in particular to an apparatus for roasting coffee beans.

As today's society develops and becomes more sophisticated, coffee houses and retail stores more frequently offer their customers an inventory of "exotic coffees". However, the demand for each particular kind of coffee is still relatively low for most individual stores and hence the coffee which is available today is often either stale when it is bought or becomes stale within a few weeks thereafter. This occurs because roasted coffee beans lose their freshness very quickly; and thus the inability to maintain a fresh inventory of roasted coffees for resale to the public is a problem for the retail establishment.

On the other hand, green coffee beans remain fresh almost indefinitely; and if the customer had access to a coffee roaster, for example at home, he could buy the green beans and roast them according to his needs. Unfortunately, however, the industrial coffee roasters which are commercially available and which are in wide use, are oriented toward processing between 25 and 400 pounds of coffee beans at a time; and while sample roasters exist for use by coffee buyers, they are large and heavy devices not suited for the average kitchen. Also, coffee roasters which are available now for restaurants and hotels require larger amounts of coffee than the average consumer can use in a reasonable time, and they are relatively expensive. Thus, the average consumer is not in a position, with the commercial apparatus presently available, to practically roast his own beans and must satisfy himself with store roasted coffee which either is or will shortly become stale.

Therefore, a principal object of this invention is a coffee roaster which is well within the financial reach of the average household, which is reliable and simple to use, which can rest on the kitchen countertop without taking excessive space, and which can be constructed in varying capacities, from one or two cups for home use to more than two cups for hotel and restaurant use. Other objects of the invention are a coffee roaster for personal use which requires little maintenance, which provides different degrees of roasting, and which has low weight and small physical size.

SUMMARY OF THE INVENTION

The invention relates to an apparatus for roasting coffee beans. The apparatus features a roasting chamber having at least one perforate wall, an exit orifice in gaseous communication with the roasting chamber, elements for creating a heated gaseous flow through the perforate wall and into the roasting chamber, and members external of the roasting chamber for variably controlling the rate of heated gas flow through the chamber.

In particular aspects of the invention, the external control members comprise a cover, the cover mounting a manually movable member for blocking at least a portion of the exit orifice whereby the gas flow through the roasting chamber can be controlled and wherein the manually movable member has a structure whereby the exit orifice cannot be completely blocked. In the illustrated embodiment described hereinafter, the exit orifice is in the cover.

In other aspects, the apparatus features a shaft element inclined to a vertical axis and extending through an interior portion of the roasting chamber, a stirring element connected to the shaft element in the interior portion and rotatable by the shaft around a shaft axis for stirring the contents of the roasting chamber, a motor for rotating the shaft and the stirring element, and elements for mounting the shaft motor member, the stirring element, and the roasting chamber in an axial alignment whereby the stirring element effects tumbling of the contents of the roasting chamber when it is rotated.

The invention further features, in a particular embodiment, a fan element in a bottom portion of the housing for the apparatus, a heating element for providing gaseous flow communication between the fan element and the top portion of the housing in which the roasting chamber is contained, and a diverting member for directing a portion of the gas flow from the fan toward the bottom portion of the housing for cooling the lower housing portion.

DESCRIPTION OF THE DRAWINGS

Other objects, features, and advantages of the invention will appear from the following description taken together with the drawings in which.

DESCRIPTION OF A PREFERRED EMBODIMENT

Figure 1:
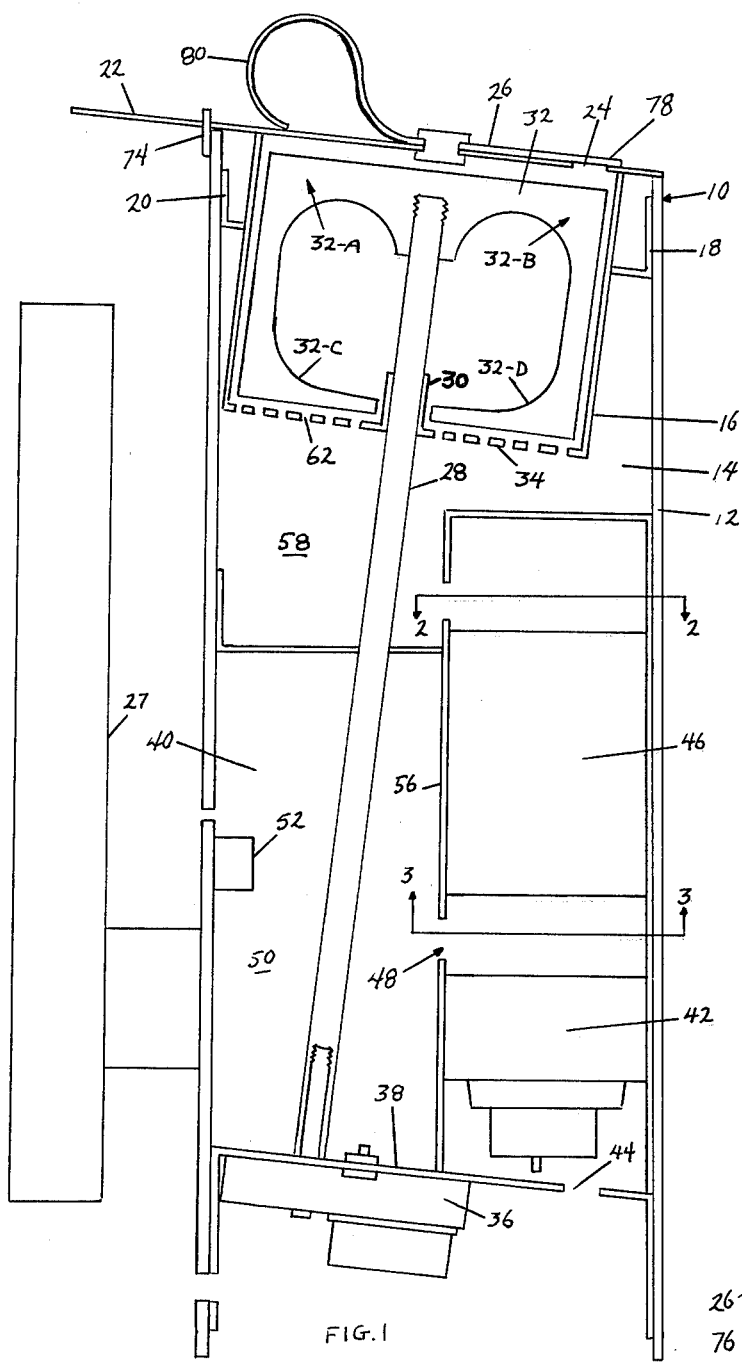
FIG. 1 is a cross-sectional view of a coffee roasting apparatus according to the invention.
Figure 2:
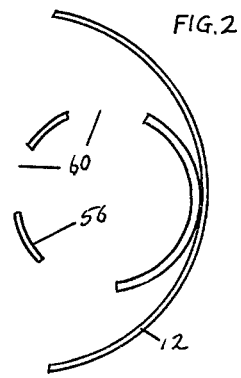
FIG. 2 is a cross-sectional view along lines 2—2 of FIG. 1.
Figure 3:
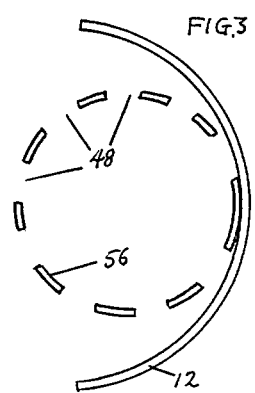
FIG. 3 is a cross-sectional view along lines 3—3 of FIG. 1.

Referring to FIG. 1, a coffee roaster 10, according to the invention, has a cylindrically shaped housing 12 which encloses the elements of the roaster. In a top section 14 of the housing is a roasting well or chamber 16 securely mounted in a fixed position to plenum skirt elements 18, 20. The top of the illustrated roasting well is open and is substantially flush with a top cover 22 which has an orifice 24 therein. A manually controlled orifice cover 26 selectively closes the orifice 24 as described in more detail herein below. A lifting handle 27 is secured to one side of housing 12.

A rotating shaft 28 passes through a sleeve 30 of roasting well 16 and is axially aligned with a symmetry axis of the roasting chamber. Secured to a top portion of the shaft 28 is a stirring element 32. In the illustrated embodiment, the stirring element 32 has paddle members 32-A, 32-B designed to stir the coffee bean mass in the roasting well. The bottoms 32-C, 32-D of the paddle members are in a spaced apart relation close to a bottom wall 34 of the roasting chamber in order to turn coffee beans lying on the bottom of the roasting well.

Shaft 28 is driven by a rotating stirring motor 36 mounted to a bottom housing member 38. Motor 36 may be for example an Ingraham motor operating at, for example, thirty revolutions per minute.

The bottom housing member 38 defines the bottom portion of a lower housing section 40. An air fan 42 in the lower housing section pulls air through an opening 44 and forces the air either through a heating element 46 or through bypass openings 48 into a bypass chamber 50. Illustrated fan 42 is preferably an air sealed fan and provides an air flow of 30 cubic feet per minute.

That portion of the air flow which is diverted to the bypass chamber 50 aides in preventing the fan from stalling and maintains the lower portion of the roaster which contains stirring motor 36, electrical elements 52, and the fan 42 itself, at a satisfactory operating temperature. The output of fan 42 which is not diverted, passes through the heating element 46 and becomes heated to approximately 500° Farenheit. Heating element 46 can be for example a 1200 watt heater. Both the heating element 46 and fan 42 can be mechanically press fit into the housing portion formed by cylindrical member 56.

The air exiting from heating element 46 enters the upper section of the roasting apparatus housing and in particular into the roasting well plenum 58 through openings 60 of cylindrical housing 56. The roasting well plenum 58 and the housing 12 combine to confine the heated air to the area surrounding the roasting well. The heated air enters the roasting well through an array of small holes or perforations 62 in the bottom wall 34 of the roasting well. The heated air flow through these small holes 62 absorbs moisture given off by the heated coffee beans and air flow exits through the roaster cover orifice 24. The continued exposure of the green coffee beans in the roaster well to the heated air causes the coffee to become lighter in weight, darker in color, and larger in volume.

The orifice 24 in the roaster cover regulates the temperature of the heating element exhaust air by slowing or increasing the air flow through the heating element and hence through the roasting well. This manner of controlling the temperature provides an added benefit since a reduced air flow and hence hotter temperatures in the roasting well causes a correspondingly increased air flow through the bypass openings 48 and thus provides increased cooling compensation in the lower portion of the housing. This compensates for the increased temperature of the roasting well itself.

Figure 4:
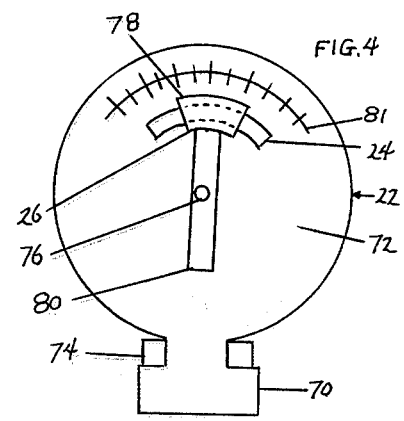
FIG. 4 is a top plan view of the apparatus according to the invention.

Referring to FIG. 4, the top cover 22 of the illustrated roasting apparatus has a cover handle 70 and a substantially circular, covering portion 72. The top cover rests in and is secured by a bifurcated member 74. The orifice 24 is provided in the covering portion 72 and in the illustrated embodiment, the orifice corresponds to a portion of an annular ring. The orifice cover 26, in this illustrated embodiment, comprises a substantially T-shaped member, pivoted at 76, which has at one end 78 a covering portion and at the other end 80 a handle portion. By moving orifice cover 26 about its pivot point 76, a portion of the orifice 24 can be closed. In the illustrated embodiment, however, it is not possible to close the entire orifice 24 since this would prevent any air from passing through the roasting well and would force all air to enter the lower housing section 50. This is not a reliable mode of operation for the illustrated embodiment of the apparatus. In other embodiments of the invention, other orifice openings and manual (or automatic) covering apparatus can be employed to restrict the air flow through the roasting well.

Figure 5:
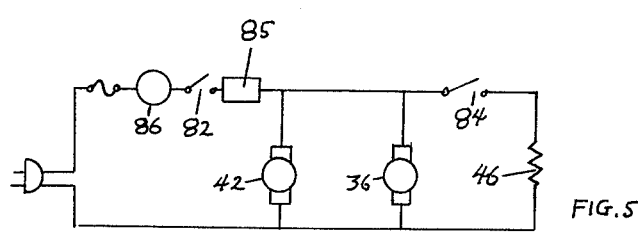
FIG. 5 is an electrical schematic of a control circuitry for the apparatus according to the invention.

Referring now to FIG. 5, in operation, the user pours one or two cups of green coffee beans into the roasting well at the top of the roaster with the cover off. He then positions the cover, over the roasting well, sets the orifice cover to provide a desired air flow (and in this respect an air flow roasting indication 81 can be provided) and switches the unit on by closing a roaster switch 82. The closing of switch 82 initiates rotation of the stirring element 32 and turns on fan 42. Once operation of the fan unit and stirring motor have begun, the user closes a heater element switch 84 which applies power to the heating element 46 for heating air passing to and through the roasting well to the temperature selected by orifice cover 26, preferably about 500° Farenheit. A safety switch 85 protects the apparatus from a thermal overload.

Thus, the fan 42 at the bottom of the roaster draws air into the roaster through orifice 44 and directs that air to the flameless electrical heating element 46 and then to and through roasting well 16. The degree of roast and the darkness of the beans is determined by the cover orifice setting and the amount of time that the beans are in the apparatus. Light roasts result from the light orifice setting (that is a high air flow rate) and a short roasting time. Dark or expresso coffee roasts result from a very narrow orifice setting (hence a slow air flow rate) and a long roasting time. Since time as well as temperature affect the degree of roasting, an electrical timer 86 can be employed to automatically terminate operation of the apparatus.

As noted above, two switches must be turned on in order to initiate the roasting operation, that is roaster switch 82 and heater switch 84. After the desired roasting interval terminates, the user turns off the heating element switch 84 but leaves the roaster switch 82 on in order to cool the beans. Thereafter, roaster switch 82 is opened, the top cover is removed, and the freshly roasted beans are thereupon removed and are placed, for example, in a storage container.

The illustrated roasting apparatus has a substantially vertical orientation and can be used in areas where counter or shelf space is limited. While in the illustrated apparatus, roasting capacity has been limited to one or two cups of green coffee beans in order to minimize size, cost, and weight, larger capacity roasters for use not in the kitchen but for example, in hotels or restaurants and operating on the same principles could be easily constructed.

Thus, additions, subtractions, deletions, and other modifications of the preferred embodiment of the invention would be obvious to one skilled in the art and are within the scope of the following claims.

What is claimed is:

1. An apparatus for roasting coffee beans comprising a roasting chamber having at least one perforate wall, means for creating a continuous heated gaseous flow through said perforate wall into said roasting chamber, said means having
   an exit orifice in gaseous communication with said roasting chamber for allowing said gaseous flow to exit outside of said apparatus,
   means external of the roasting chamber for variably controlling the rate of flow of said heated gas through said roasting chamber, said external control means comprising a cover, said cover mounting a manually movable member for blocking at least a portion of said exit orifice,
   whereby said gas flow through said roasting chamber can be manually controlled.

2. The apparatus of claim 1 wherein said manually movable member has a structure whereby said exit orifice cannot be completely blocked.

3. The apparatus of claim 2 wherein said exit orifice is an aperture in said cover.

4. An apparatus for roasting coffee beans comprising
a roasting chamber having at least one perforate wall,
means for creating a continuous heated gaseous flow through said perforate wall into said roasting chamber, said means having
an exit orifice in gaseous communication with said roasting chamber for allowing said gaseous flow to exit outside of said apparatus,
means external of the roasting chamber for variably controlling the rate of flow of said heated gas through said roasting chamber,
a shaft means inclined to a vertical axis and extending through an interior portion of said roasting chamber,
a stirring element connected to said shaft means in said interior portion and rotated by said shaft around a shaft axis for stirring the particulate contents of said roasting chamber,
means for rotating said shaft and said stirring element, and
means for mounting said rotating means, said shaft, and said roasting chamber in axial alignment whereby said stirring element effects tumbling when coffee beans are in said roasting chamber.

5. The apparatus of claim 4 wherein said stirring element comprises
a plurality of stirring paddles, at least one of said stirring paddles having the bottom portion positioned in a spaced apart relation close to a bottom wall of said roasting chamber for effecting movement of roasting beans by said bottom portion.

6. An apparatus for roasting coffee beans comprising
a roasting chamber having a bottom perforate wall,
a top exit orifice in gaseous communication with said chamber,
a shaft element inclined to a vertical axis extending through an interior portion of said roasting chamber,
a stirring element connected to said shaft element in said interior portion and rotated by said shaft around a shaft axis for stirring the contents of said roasting chamber,
a motor means for rotating said shaft and said stirring elements,
a housing enclosing said roasting chamber, said stirring element, said shaft element, and said motor means,
said housing including
means for mounting said roasting chamber, said shaft element, and said motor means in axial alignment whereby said stirring element effects tumbling of the contents of said roasting chamber,
a top housing portion and
a bottom housing portion,
a fan element in the bottom portion of said housing,
a heating element for providing gaseous communication between said fan element and said top portion of said housing, said roasting chamber being mounted in said top portion of said housing,
gas flow restriction elements in said top housing portion for preventing heated gas entering said top housing portion from exiting other than through said roasting chamber, and
a top cover for covering said housing and said roasting chamber, said cover having
said exit orifice, and
a manually movable orifice closing member for blocking at least a portion of said exit orifice,
whereby gas flow through said roasting chamber exits through said orifice and the rate of gas flow through said orifice can be manually controlled.

7. The apparatus of claim 6 wherein said manually movable orifice closing member comprises
a pivotal member rotatably mounted on said cover, said member having an exit orifice closing portion for blocking a portion of said exit orifice.

8. An apparatus for roasting coffee beans comprising
a roasting chamber having at least one perforate wall,
means for creating a heated gaseous flow through said perforate wall into said roasting chamber, said means having
an exit orifice in gaseous communication with said roasting chamber,
a fan element in a bottom portion of a housing for said apparatus,
a heating element providing gaseous communication between said fan element and a top portion of said housing in which said roasting chamber is contained, and
means for directing a portion of the gas flow from said fan through the bottom portion of said housing for cooling said housing bottom portion, and
means external of the roasting chamber for variably controlling the rate of flow of said heated gas through said roasting chamber.

9. The apparatus of claim 8 further comprising gas flow restriction elements in said top housing portion for preventing heated gas entering said top housing portion from exiting other than through said roasting chamber and said orifice.

* * * * *